United States Patent Office 3,430,916
Patented Mar. 4, 1969

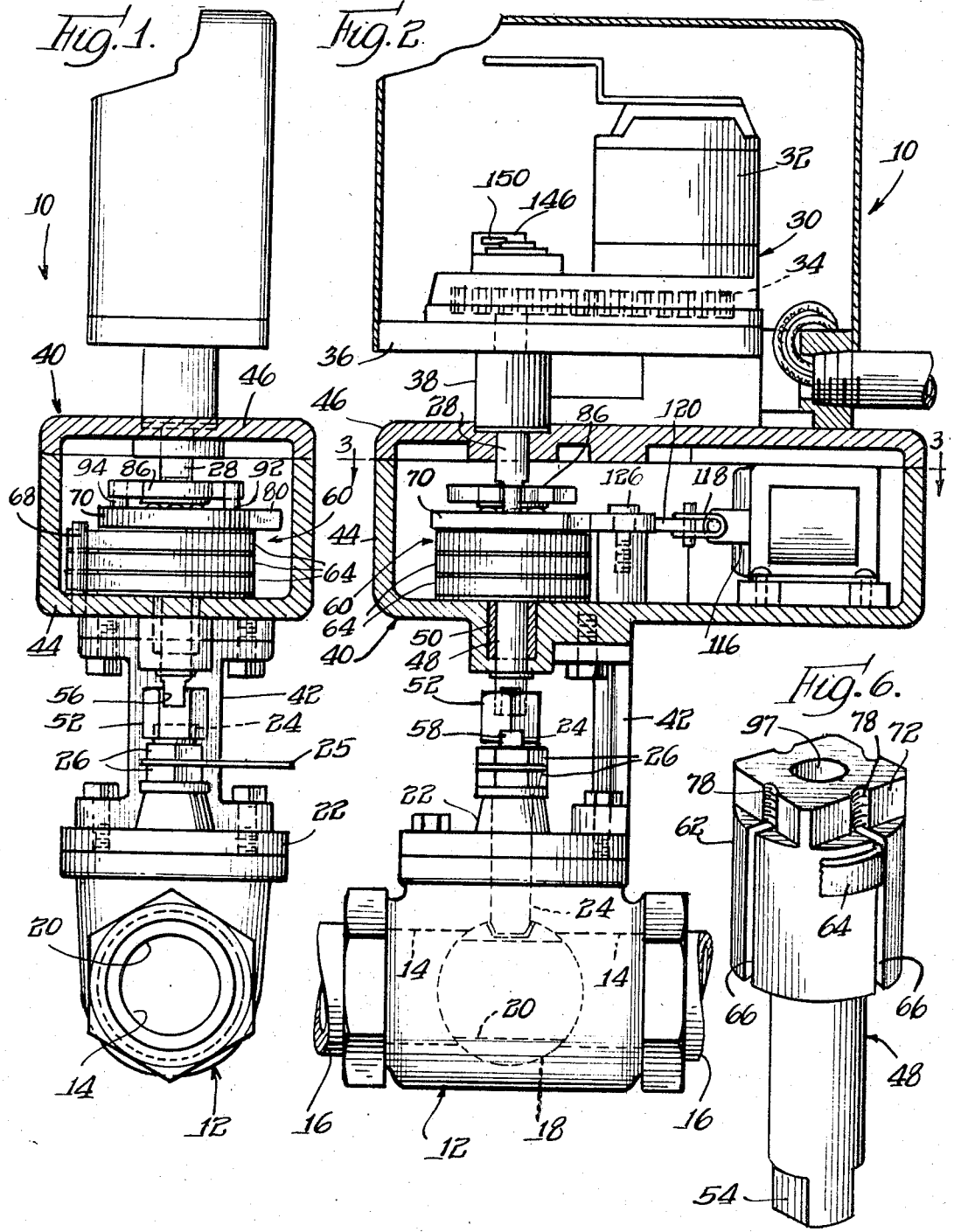

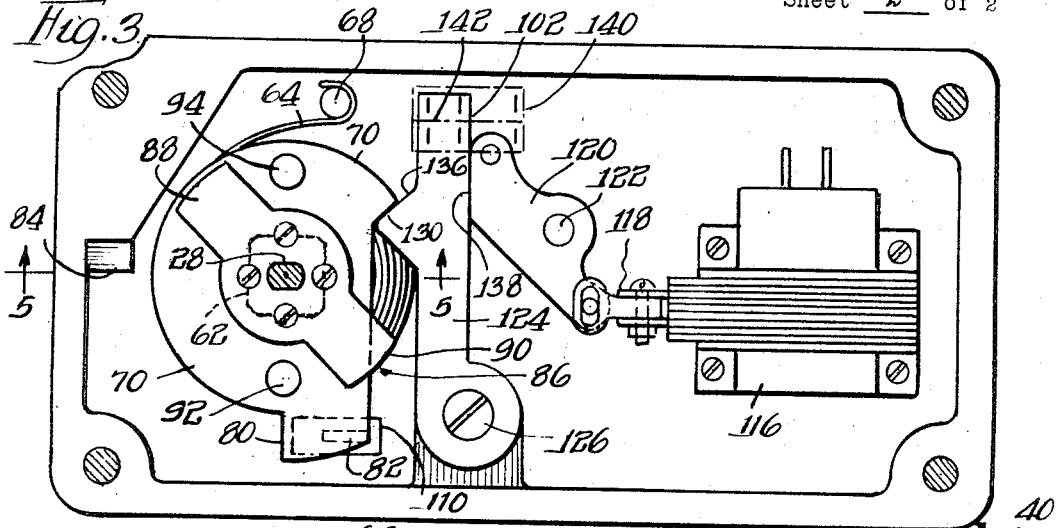
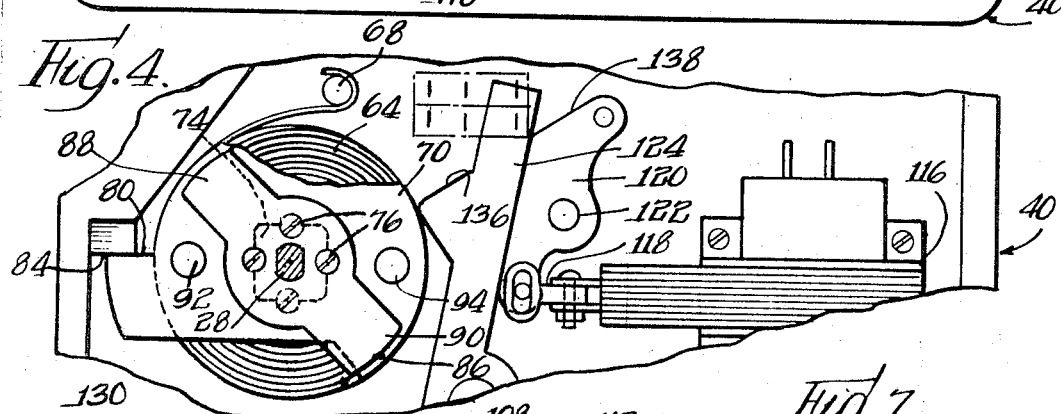
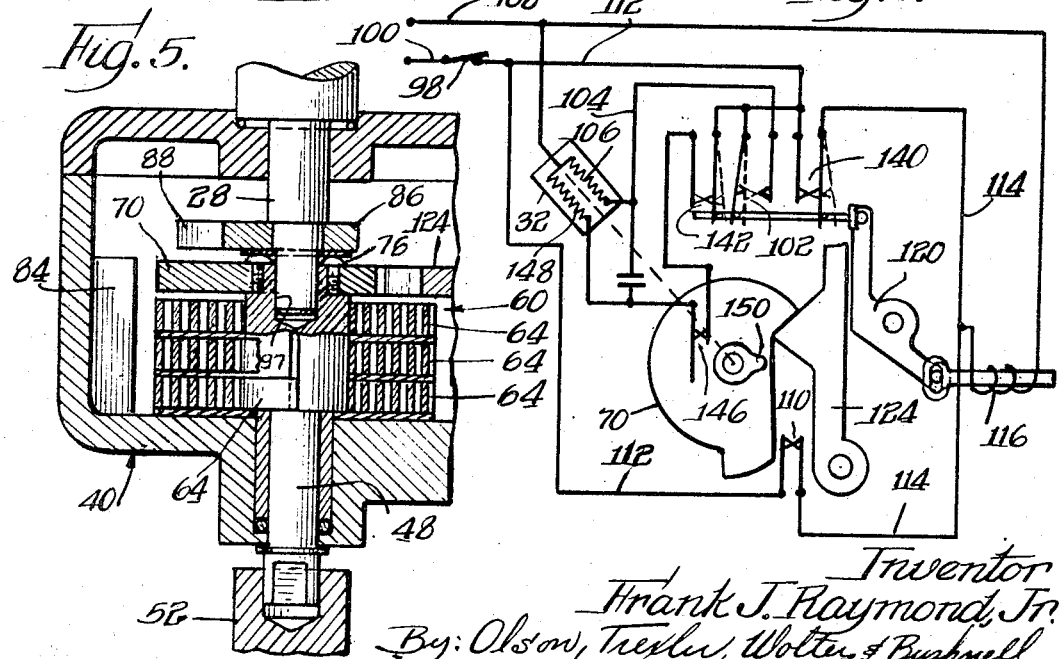

3,430,916
ELECTRICALLY OPERATED VALVE
Frank J. Raymond, Jr., Barrington Hills, Ill., assignor to Ramcon Corporation, Elgin, Ill., a corporation of Illinois
Filed Apr. 11, 1967, Ser. No. 630,050
U.S. Cl. 251—71    9 Claims
Int. Cl. F16k 31/04

ABSTRACT OF THE DISCLOSURE

An electrically operated valve having a rotary flow control ball continuously connected through a torque multiplying transmission with a valve opening electric motor that need produce valve actuating torque in only one direction. A valve closing spring, energized upon opening of the valve, operates without the aid of torque multiplying means to quickly turn the ball to its closed valve position without rotating the electric motor or the torque multiplying transmission even though the latter is continuously connected to the ball. The valve closes in response to operation of control circuitry or loss of electric power. Construction of the valve permits usage of many standard components with consequent minimization of manufacturing cost.

---

The present invention relates to valves, particularly ball valves, which are opened by electric power and closed by spring power.

One object of the invention is to provide a valve, opened by electric power and closed by spring power, which has a new and improved construction which effects a very quick and effective closing of the valve by a minimum of spring energy.

Another object is to provide a valve, according to the preceding object, having an improved construction which enables spring means of effectively minimized size and strength to effect quick closing of the valve without the aid of a torque multiplying transmission, the torque produced by the spring means being applied directly to turn the valve to its closed condition.

Another object is to provide a valve of the character recited having an improved construction which continuously maintains a positive drive connection between a rotatable flow control element or ball in the valve and an electric driving motor and torque multiplying transmission used to turn the flow control element to its open valve position while, at the same time, providing for quick closing of the valve under normal conditions by the energy of spring means which is relieved of any necessity for driving the valve opening motor and speed reducing transmission as an incident to closing of the valve.

Another object is to provide an improved valve of the character referred to which functions in response either to operation of a control switch or loss of electrical power in the electric power supply to effect a quick and dependable valve closing action by the energy of spring means which normally operates to close the valve without turning an electric motor used to open the valve, the construction of the electric and spring powered valve being such that the electric motor need have the capability of supplying in only one direction of motor rotation an output torque suitable for actuating the valve.

Another object is to provide a valve as set forth in the preceding objects which can be readily opened manually without strain in the event of a power failure.

A further object is to accomplish the preceding objects by means of an improved valve of the character recited having a highly advantageous construction which minimizes the manufacturing cost of the valve by using a generally standard and hence low cost driving motor and torque multiplying assembly to supply driving torque sufficient in degree to directly drive the valve flow control member rotatably to its open valve position and, at the same time, wind the valve closing spring means, the specially designed working components of the valve drive being simplified in number and construction and confined for the most part within a housing of minimized size which supports the driving motor and torque multiplying assembly.

Other objects and advantages will become apparent from the following description of the exemplary embodiment of the invention illustrated in the drawings, in which:

FIGURE 1 is a partially sectioned end view of a valve forming the exemplary embodiment of the invention illustrated;

FIG. 2 is a partially sectioned side view of the valve;

FIG. 3 is a sectional view on a somewhat enlarged scale, taken generally along the line 3—3 of FIG. 2, and illustrating the position of the parts when the valve is open;

FIG. 4 is a fragmentary sectional view generally similar to FIG. 3, but illustrating the position of the parts after the valve is closed, certain structures being broken away to better reveal underlying parts;

FIG. 5 is a fragmentary sectional view taken along the line 5—5 of FIG. 3;

FIG. 6 is a perspective view on an enlarged scale of an operating shaft used in the valve; and FIG. 7 is a diagrammatic illustration of the electrical circuit and associated controls used in operating the valve.

Referring to the drawings in greater detail, the valve 10 forming the exemplary embodiment of the invention illustrated comprises a valve body 12 defining internal flow passages 14 adapted to connect with fluid conduits 16. A flow control member or ball 18 is positioned in the body 12 for rotation between an open valve position, illustrated in FIGS. 1 and 2, in which a flow bore 20 in the ball 18 is aligned with and connects the passages 14 and a closed position in which the ball is rotated approximately one-quarter revolution from its open valve position and the ball bore 20 is turned out of alignment with the passages 14 so that the ball blocks communication between the two passages 14. In this instance, the valve body 12 includes a removable bonnet 22 through which the ball 18 is assembled into the body.

The ball 18 is rotated through approximately one-quarter revolution in opposite directions between its open valve and closed valve positions by a control stem 24 nonrotatably connected with the ball 18 and extending outwardly through the bonnet 22.

The condition of the valve being opened or closed is positively indicated visually by means of a radially projecting indicator 25 clamped between two nuts 26 on the outer end of the control stem 24.

Valve actuating torque sufficiently strong to directly rotate the valve 18 from its closed valve to its open valve position while simultaneously storing spring energy in the valve for subsequently opening the valve is supplied by an electrically powered drive shaft 28 projecting from an electric power assembly 30 which comprises an electric driving motor 32 and a torque multiplying transmission 34 connecting the electric motor 32 to the drive shaft 28. The power assembly 30 includes a base 36 suitable for mounting the assembly and supporting a bearing 38 through which the drive shaft 28 projects.

For the most part, the working parts of the power assembly 30, including the motor 32 and torque multiplying transmission 34, are such that they can be obtained from commercial sources as a predesired stock assembly, thus affording all the advantages of low cost mass production in the electrically powered construction which rotates the drive shaft 28 in a valve opening direction with a driving torque having the strength required to operate the valve in the manner to be described.

The specially designed and manufactured parts used to construct the valve 10 are quite limited in number and contained in large measure in a housing 40 rigidly supported on the valve bonnet 22 as by means of a pedestal 42. To provide access to internal parts, the housing 40 is constructed in two separate parts, a deep lower section 44 covered by a comating removable cover 46 which forms a steady platform on which the power assembly 30 is mounted in such fashion that the drive shaft 28 extends into the housing 40 as shown in coaxial relation to the control stem 24 projecting from the bonnet 22.

The flow control ball 18 is located in each of its open valve and closed valve positions and is rotated between these two operating positions by means of an operating shaft 48, FIGS. 2, 3 and 6, journalled in a bearing 50 in the lower section 44 of the housing 40 in coaxial relation to both the control stem 24 and drive shaft 28.

The lower end of the operating shaft 48 is connected with the outwardly projecting or upper end of the control stem 24 by means of a multi-purpose coupling 52 which accommodates commercial degrees of misalignment of the operating shaft 48 with respect to the control stem 24 while, at the same time, providing for manual opening of the valve in the event of a power failure. As shown, the lower end of the operating shaft 48 is flatted at 54, FIG. 6, and extends into a transverse slot 56, FIG. 1, in the adjacent upper end of the coupling 52 which is generally coaxial with the operating shaft. The upper end of the control shaft 24 is similarly flatted and extends into a transverse slot 58 formed in the lower end of the coupling 52 in generally perpendicular relation to the upper slot 56. The orientation of the slots 56, 58 at right angles to each other enables the coupling to accommodate relative misalignment of the shaft 48 and operating stem 24.

The peripheral external surface of the coupling 52 is formed to have a hexagon shape adapted to be readily received within an ordinary wrench which can be applied to the coupling and used manually to turn the valve between its closed valve and open valve positions in the event of a power failure. It will be noted that the supporting pedestal 42 for the housing 40 is located wholly to one side of the coupling 52 to provide ready access to the coupling for manual operation of the valve by a wrench of any desired length.

Spring torque having strength sufficient to assure rotation of the valve ball 18 from its open valve to its closed valve position is applied by spring means 60 connected directly to the operating shaft 48.

Immediately within the housing 40, the operating shaft 48 is diametrically enlarged to provide on the shaft a generally cylindrical winding hub or core 62, FIG. 6, for the spring means 60 which is formed by one or more, in this instance three, spiral springs 64 disposed in encircling relation to the hub 62. The inner ends of the springs 64 are turned radially inward and anchored in any of a plurality of circumferentially spaced and axially extending radial slots 66, FIG. 6, formed in the spring hub 62. The outer ends of the spiral springs 64 are anchored to a fixed anchor 68, FIGS. 3 and 4, in the housing 40.

The springs 64 are prewound by rotation of the operating shaft 48 as necessary to provide in the springs residual stress sufficient to apply to the operating shaft 48 torque of a degree sufficient to assure rotation of the valve ball 18 from its open valve to its closed valve position. The valve closing torque is applied by the springs directly to the operating shaft 48, the inner or movable ends of the springs being anchored in the spring anchoring slots 66.

The valve ball 18 is positively located in its closed valve and open valve positions respectively and is power driven from its closed valve to its open vale position by means of a multi-purpose, simple operating disc 70, fixed to the inner end of the operating shaft 48 for rotation with the shaft. A positive driving connection between the operating shaft 48 and the operating disc 70 is provided by a squared driving boss 72 formed on the upper end of the shaft 48 adjacent the spring hub 62 and extending into a square opening 74, FIG. 4, in the operating disc 70. The multi-purpose operating disc 70 is held axially against the adjacent end of the spring hub 62 by four screws 76, FIG. 4, extending into threaded screw holes 78 formed partly in the square support boss 72 for the operating disc, as shown in FIG. 6.

When free to rotate, the operating disc 70 and the connected flow control ball 18 are rotated by the springs 64 in a valve closing direction until a first stop abutment 80, FIG. 3, defined by a short radial arm on the disc 70 engages a fixed stop or abutment 84 on the housing 40, as shown in FIG. 4, to positively locate the disc 70 and hence the ball 18 in the closed valve position for the ball.

The previously mentioned power drive shaft 28 extending into the housing 40 from the power assembly 30 is positively connected continuously to the operating disc 70 for rotating the disc 70 and ball 18 in a valve opening direction in a manner which provides for subsequent rotation of the disc 70 and ball 18 back to the normal or closed valve position for the ball by the torque supplied directly to the operating shaft 48 by the spring means 60, which spring means is relieved of any necessity for rotating the electric motor 32 or torque multiplying transmission 34 as the ball is returned to its closed valve position.

The positive driving connection which serves this purpose is made by means of a valve opening spider 86, FIGS. 3 and 4, mounted on the inner end of the drive shaft 28 in parallel relation to the operating disc 70, as shown in FIG. 2. The spider 86 includes two arms 88, 90 extending radially in diametrically opposite directions in parallel overlying relation to the operating disc 70. The two driving arms 88, 90 are disposed in positive interfering relation to two clutch elements or driving studs 92, 94, FIGS. 1, 3 and 4, fixed to the operating disc 70 and extending upwardly into the rotary path of the respective driving arms 88, 90.

Because of the clutch elements or driving studs 92, 94 being permanently disposed in the rotary path of the spider arms 88, 90, the drive shaft 28 is permanently connected in driving relation to the flow control ball 18. However, the circumferential dimensions of the radial arms 88, 90 are limited to provide a degree of rotary lost motion between the drive shaft 28 and the operating disc 70 which is in excess of one-quarter revolution, thus providing, as will presently appear, for electrically powered rotary retraction of the spider 86 and its associated electrically powered driving mechanism without turning the valve ball 18 and without disrupting the positive driving connection between the drive shaft 28 and ball 18.

To provide mutual radial support between the drive shaft 28 and operating shaft 48, the inner end of the drive shaft 28 is piloted or journalled rotatably within an axial bore 97 in the adjacent end of the operating shaft 48, as shown in FIGS. 5 and 6.

Having reference to the control circuitry illustrated in FIG. 7, the valve is opened by closing a control switch 98 which energizes the electric motor 32 to turn the ball 18 to its open valve position. The control switch 98 may be closed manually or in any other manner desired.

As indicated diagrammatically in FIG. 7, closure of the control switch 98 connects the electrical power conductor 100 through a normally closed motor advancing switch 102 with a conductor 104 leading through a motor advancing coil 106 of the electric motor 32 to an electrical power conductor 108, thus completing an energizing circuit through the motor 32. The motor 32 operates through the standard torque multiplying transmission 34, as described, to turn the spider 86 in a valve opening direction bringing the spider arms 88, 90 into engagement with the clutch studs 92, 94. Electrically powered rotation of the drive shaft 28 and the then driven ball 18 continues in a valve opening direction until the valve ball reaches its open valve position.

When the ball 18 reaches its open valve position, the operating disc 70 actuates a limit switch 110, illustrated schematically in FIG. 3 and diagrammatically in FIG. 7, closing the switch 110 to complete a circuit from a conductor 112, energized through the control switch 98, to a conductor 114 connected to one side of a control solenoid 116, the other side of which is connected to the power conductor 108.

As shown in FIGS. 2, 3 and 4, the control solenoid 116 is mounted in the housing 40 and connected through a link 118 with one end of a control lever 120, which is swingably supported medially by a support pivot 122 in the housing 40. Energization of the solenoid 116 retracts the link 118 to swing the control lever 120 in a counterclockwise direction from the position illustrated in FIG. 4 to the position illustrated in FIG. 3 causing the end of the lever 120 opposite from the link 118 to work against a swingable stop lever 124 to swing the lever toward the operating shaft 48, the stop lever 124 being swingable within the housing 40 about a support pivot 126, FIG. 3, in one end of the stop lever.

A radial abutment or shoulder 130 on the operating disc 70 is engaged by a similarly oriented stop or locating abutment 136, FIG. 3, on the stop lever 124 as an incident to swinging of the lever 124 toward the operating shaft 48 upon energization of the control solenoid 116.

It will be noted at this point that swinging of the control lever 120 to swing the stop lever 124 into its active position, illustrated in FIG. 3, brings a flat support surface 138 on the control lever 120 into parallel relation and engagement with the adjacent side of the stop lever 124. The position of the support surface 138 on the control lever 120 and its angular orientation in relation to the support pivot 122 for the control lever 120 are such that when the stop lever 124 is swung into its active position by the control lever 120, the support surface 138 approaches, but stops somewhat short of a "dead center" position in relation to the support pivot 122 and the adjacent side of the lever 124 engaged by the support surface 128. This is of advantage in minimizing the solenoid force required to continue holding the stop lever 124 in its advanced or active position while, at the same time, enabling the reaction of the stop lever 124 on the control lever 120 to swing the control lever 120 out of its supporting relation to the stop lever 124 when the solenoid 116 is deenergized as will presently appear.

It is also noteworthy that the positional relationship of the support pivot 126 for the stop lever 124 in relation to the operating disc abutment 130 and the coacting stop lever abutment 136 when the abutments 130 and 136 are mutually engaged is such that the mutually engaged portions of the abutments 130 and 136 are spaced a limited distance from a "dead center" position in relation to the pivot 126 and abutment 130 so that the rotary reaction of the stop lever 124 on the control lever 120 as a consequence of torsional spring force applied by the abutment 130 to the lever abutment 136 is greatly reduced in relation to the force of the abutment 130 on the abutment 136, but is still effective to swing the stop lever 124 away from the operating shaft 48 to disengage the abutment 136 from the abutment 130 upon deenergization of the solenoid 116.

Upon energization of the control solenoid 116, the control lever 120 operates to close the normally open solenoid holding switch 140, to open the normally closed motor advancing switch 102, and to close the normally open motor reversing switch 142, shown schematically in FIG. 3 and illustrated diagrammatically in FIG. 7. Closure of solenoid holding switch 140 completes a circuit from energized conductor 112 to the conductor 114 to maintain energization of the solenoid 116.

Opening of the motor advancing switch 102 breaks the motor advancing circuit through the winding 106 of the motor 32 to stop the forward rotation of the motor 32. The simultaneous closing of the motor reversing switch 142 completes a circuit from the energized conductor 112 through the stop switch 146, illustrated schematically in FIG. 2 and diagrammatically in FIG. 7, and through a motor reversing coil 148, FIG. 7, to the other power conductor 108.

As a consequence, the motor 32 is energized electrically to rotate in a reversing direction to rotatably retract the previous rotary advancing motion of the transmission 34 and drive shaft 28. At this time, the spider 86 rotates free in its reverse direction, the previously described rotary lost motion between the spider 86 and operating disc 70 permitting limited free reverse rotation of the spider while the operating disc 70 is firmly held in its valve open position by the continuing action of the energized control solenoid 116 in holding the stop lever abutment 136 in engagement with the operating disc abutment 130.

It should be observed that since the electric motor 30 drives only the free running transmission 34 and the free turning drive shaft 28 when the motor is operating in reverse, the motor 30 need be designed to provide its full output torque in only one direction, that is the direction of motor rotation corresponding to the electrically powered valve opening movement of the flow control ball 18.

When the spider 86 is electrically driven back to its starting position, a switch operating cam 150 rotatable with the outer end of the drive shaft 28, FIGS. 2 and 7, opens the switch 146 to deenergize the motor 32 leaving the spider 86 rotatably retracted to its starting position.

It may be noted here that in order to assure an opportunity for the stop lever 124 to reach its operative position bringing the stop lever abutment 136 into opposing relation to the operating disc abutment 130 before the motor 32 is electrically reversed, the switch 110, FIGS. 3 and 7, can be positioned to allow the operating disc 70 to be driven slightly beyond its open valve position before the switch 110 is closed to set in motion the motor reversing phase of the valve opening cycle. As the motor 32 begins its electrically powered reverse movement, the spring means 60 effects a reverse movement of the operating disc 70 sufficiently to return the flow control ball 18 to its open valve position where it is accurately located by engagement of the operating disc abutment 130 with the stop lever abutment 136.

To effect closing of the valve, it is necessary only to open the valve control switch 98 thereby deenergizing the control solenoid 116, whereupon the spring means 60 responds immediately to displace the stop abutment 136 out of the path of the abutment 130 and acts directly on the operating shaft 48 to turn the flow control ball 18 back to its closed valve position. This action is accompanied by swinging of the control lever 120 back to its normal position and closing of the switch 102 in preparation for the next valve opening action, which ensues upon subsequent closing of the main control switch 98.

It will be appreciated that the control switch 98 serves as the main energizing switch for the circuitry described, the circuitry responding to energization through the switch 98 to open the valve and keep it open so long as the circuitry is energized through the switch 98. Deenergization of the circuitry either as a consequence of opening of the control switch 98 or by reason of a power failure immediately results in deenergization of the solenoid 116 and spring powered return of the valve to its closed position. In this manner, the valve provides the recognized advantages of being self-closing in the event of a power failure, an abnormal condition in which the fact of the valve remaining open could cause damage or disaster to the system in which it is used.

It should be noted at this point that the spring means 60 is operable to return the valve to its closed condition even through the driving spider 86 and the power transmission connected with the spider 86 have not been previously returned to their normal starting positions by electrically powered reverse operation of the motor 32. If necessary, the spring means 60 will drive the spider 86 and the connected transmission 34 and motor 32 in reverse as an incident to turning of the valve ball 18 to its closed valve position. While this action does delay the progress of the valve closing action, closure of the valve by the spring means is, nevertheless, achieved.

It is also noteworthy that manual opening of the valve by means of the hexagon shaped coupling 52 can be effected without rotation of the torque multiplying transmission 34 and connected motor 32, the rotary lost motion provided between the operating disc 70 and the spider 86 providing sufficient rotary clearance for manual turning of the valve between its closed and open positions without rotating the spider 86. Nevertheless, in the event the spider 86 should be stopped in any position other than its starting position on account of a power failure, for example, manual operating torque applied to the coupling 52 is effective for driving the torque multiplying transmission 34 and rotating the motor 32 as an incident to manual opening of closing of the valve.

It will be appreciated that there would be no reason for closing the valve manually except in the event of an extremely unlikely structural failure. Failure of the valve to close by spring power is made extremely unlikely by virtue of the utter simplicity of the spring actuated parts which move to close the valve. Essentially, the parts actuated by spring torque to close the valve are limited to the operating shaft 48, coupling 52 and the control stem 24 connected with the valve ball 18, all of which are inherently simple parts positively connected together in coaxial tandem relation to each other.

It will be appreciated that the construction illustrated can be modified in various ways by those skilled in the art without departing from the spirit and scope of the invention as defined by the claims which follow.

I claim:

1. An electrically powered ball valve comprising, in combination, a valve body, a flow control ball rotatably disposed within said body, a control stem connected with said ball and extending outwardly through said body, a housing supported on said body, a power supply assembly mounted on said housing and including a drive shaft extending into said housing in coaxial relation to said control stem, said power supply assembly including a reversible electric drive motor and a torque multiplying transmission connecting the motor to the drive shaft, a valve operating shaft journalled in said housing in coaxial relation to both said control stem and said drive shaft, a drive coupling connecting said operating shaft with said control stem and having an external surface shaped in an angular driving nut form, a plurality of spiral valve closing springs disposed within said housing and anchored thereto, said valve closing springs being connected with said operating shaft to apply a valve closing torque directly thereto, an operating disc mounted on said operating shaft for rotation therewith and defining first and second abutments thereon, a third abutment disposed in said housing in the path of rotation of said first abutment to engage the latter and stop rotation of said operating shaft in said valve closing direction upon rotation of said ball into its closed valve position by said operating shaft, said operating disc having thereon a pair of positive drive elements located on diametrically opposite sides of the axis of the disc, a power driving spider mounted on said drive shaft for rotation therewith within said housing and including radial arms disposed between said positive drive elements on said operating disc, said radial arms being positioned in rotary interfering relation to said positive drive elements for positively transmitting torque from said drive shaft through said operating disc to said ball in a valve opening direction opposite to said valve closing direction, said radial arms and said positive drive elements being dimensioned to provide in excess of one-quarter revolution of rotary lost motion between said spider and said operating disc, a stop lever defining a fourth abutment thereon and being swingably supported on a stop lever support pivot in said housing to move said fourth abutment into and out of interfering relation to said second abutment on said operating disc to hold the latter in its open valve position against spring torque urging said operating shaft rotatably in said valve closing direction, a control lever swingably supported on a control lever support pivot in said housing coacting with said stop lever to swing the latter into an operative position in which said fourth abutment is positioned in the rotary path of said second abutment to engage said second abutment for holding said operating disc in its open valve position against rotation in said valve closing direction, a control solenoid connected with said control lever to effect upon energization of the solenoid movement of said stop lever into its operative position, energizing circuit means connected with said motor and said solenoid, said circuit means including a valve opening switch for energizing the circuit means to open the valve, said circuit means including a normally closed motor advancing switch which energizes said motor upon closure of said valve opening switch to turn said drive shaft and said ball in said valve opening direction, said circuit means including a normally open solenoid energizing switch which is closed to energize said solenoid as an incident to movement of said operating disc into the vicinity of its valve open position, said circuit means including a normally open solenoid holding switch which is closed to continue energization of said solenoid as an incident to swinging of said stop lever to its operative position, said circuit means including a normally open motor reversing switch that is closed as an incident to swinging of said stop lever to its operative position to reverse said motor to rotate said drive shaft in a direction opposite to said valve opening direction, means coacting with said motor advancing switch to open the latter as an incident to closing of said motor reversing switch, and said circuit means including a normally closed motor deenergizing switch which is opened to deenergize the motor as an incident to turning of said drive shaft in said last mentioned opposite direction through an angle of at least one-quarter revolution to its starting position, and said valve opening switch being interconnected with said circuit means to deenergize said solenoid upon opening said valve opening switch.

2. An electrically powered ball valve according to claim 1 in which said operating shaft includes as an integral part thereof a generally cylindrical spring hub encircled by said valve closing springs and defining a plurality of circumferentially spaced and axially extending radial spring slots which receive and anchor the inner ends of said valve closing springs.

3. An electrically powered ball valve according to claim 1 in which said fourth abutment on said stop lever is positioned and oriented on said stop lever to have a position adjacent to but slightly spaced from a dead center position in relation to said stop lever support pivot and said second abutment on said operating disc when said stop lever is in its operative position and said second and fourth abutments are mutually engaged; and said stop lever is supported in said operative position thereof by a support surface on said control lever positioned and oriented on said control lever to occupy a position adjacent to but slightly spaced from a dead center position in relation to said control lever pivot and said stop lever when the latter is supported in its operative position by said support surface on said control lever.

4. An electrically powered ball valve according to claim 1 in which said housing means is supported on said valve body by pedestal means disposed in laterally offset relation to said drive coupling to provide free access to the latter from the lateral side thereof opposite from said pedestal means.

5. An electrically powered valve comprising, in combination, a valve body, a flow control element rotatably disposed within said body, a control stem connected with said ball and extending outwardly through said body, a housing supported on said body, a power supply assembly supported by said housing and including a drive shaft disposed in coaxial relation to said control stem, said power supply assembly including a reversible electric drive motor and a torque multiplying transmission connecting the motor to the drive shaft, a valve operating shaft journalled in said housing in coaxial relation to both said control stem and drive shaft, coupling means connecting said operating shaft with said control stem, valve closing spring means disposed within said housing and reacting thereon, said valve closing spring means being connected with said operating shaft to apply torque directly thereto in a valve closing direction, an operating disc mounted on said operating shaft for rotation therewith and defining first and second abutments thereon, a third abutment disposed in said housing in the rotary path of said first abutment to engage the latter and stop rotation of said operating shaft in said valve closing direction upon rotation of said flow control element into its closed valve position by said operating shaft, said operating disc having thereon a pair of driving elements located on opposite sides of the axis of the disc, a power driving spider mounted on said drive shaft for rotation therewith within said housing and including radial arms disposed between said driving elements on said operating disc, said driving elements being positioned in the paths of rotation of said radial arms for transmitting torque from said drive shaft through said operating disc to said flow control element in a valve opening direction opposite to said valve closing direction, said radial arms and said driving elements being dimensioned to provide in excess of one-quarter revolution of lost motion between said spider and said operating disc, a movable stop member defining a fourth abutment thereon, a control solenoid connected with said stop member to effect upon energization of the solenoid movement of said stop member into an operative position in which said fourth abutment is disposed in confronting coacting relation to said second abutment on said disc to hold the latter in its open valve position against rotation in a valve closing direction, energizing circuit means connected with said motor and said solenoid, said circuit means including control switch means for energizing said motor to turn said drive shaft and said flow control element in said valve opening direction, said circuit means including switch means for energizing said solenoid as an incident to movement of said operating disc into the vicinity of its valve open position, said circuit means including reversing switch means operable as an incident to movement of said operating disc into the vicinity of its open valve position to energize said motor to electrically rotate said drive shaft in a direction opposite to said valve opening direction thereof, and said circuit means including switch means for deenergizing said motor as an incident to turning of said drive shaft in said last mentioned opposite direction thereof through an angle of at least one-quarter revolution.

6. An electrically powered valve comprising, in combination, a valve body, a flow control element disposed in said body, a rotary control stem connected with said flow control element to move the latter between a closed valve position and an open valve position thereof, said control stem extending outwardly through said body, housing means, a power supply assembly supported on said housing means and including a drive shaft disposed in coaxial relation to said control stem, said power supply assembly including a reversible electric drive motor and a torque multiplying transmission connecting the motor to said drive shaft, a valve operating shaft journalled in said housing means in coaxial relation to both said control stem and said drive shaft, means connecting said operating shaft with said control stem to rotate the latter, valve closing spring means reacting on said housing means and being connected with said operating shaft to apply a valve closing torque directly thereto, rotary abutment means supported on said operating shaft for rotation therewith, a valve closed abutment supported on said housing means in the path of said rotary abutment means to engage the latter and stop rotation of said operating shaft in said valve closing direction upon rotation of said operating shaft into its closed valve position, lost motion connecting means continuously connecting said drive shaft in rotary driving relation to said operating shaft and providing between said drive shaft and said operating shaft at least one-quarter revolution of rotary lost motion, a valve open abutment movably supported on said housing means, a control solenoid connected with said valve open abutment to effect upon energization of the solenoid movement of said valve open abutment into an operative position for engagement with said rotary abutment means to hold said operating shaft in the valve open position against the applied torque of said spring means so long as the solenoid is energized electrically, energizing circuit means connected with said motor and said solenoid, said circuit means including means for energizing said motor for rotating said drive shaft in a valve opening direction and for energizing said control solenoid when said operating shaft reaches the vicinity of its valve open position, and said circuit means including means for reversing said motor after said operating shaft has reached its open valve position and for deenergizing said motor after said drive shaft has rotated at least one-quarter revolution in a direction opposite to said valve opening direction.

7. An electrically powered ball valve according to claim 6 in which said operating shaft includes as an integral part thereof a generally circular spring hub and said valve closing spring means comprises a spiral spring encircling said spring hub and having an inner end connected to said hub to apply torque thereto.

8. An electrically powered valve actuator for controllably rotating a valve control stem, said valve actuator comprising, in combination, housing means, a valve operating shaft journalled in said housing means and having an open valve position and a closed valve position spaced rotatably from each other, means on said valve operating shaft adapted to connect the operating shaft in generally coaxial driving relation to said control stem, a power supply assembly supported on said housing means and including a drive shaft disposed in coaxial relation to said operating shaft, said power supply assembly including a reversible electric drive motor and a torque multiplying transmission connecting the motor to the drive shaft, valve closing spring means reacting on said housing means and being connected with said operating shaft to apply a valve closing torque directly thereto, rotary abutment means supported on said operating shaft for rotation therewith, a valve closed abutment supported on said housing means in the path of said rotary abutment means to engage the latter and stop rotation of said operating shaft in said valve closing direction upon rotation of said operating shaft into its closed valve position, lost motion connecting means continuously connecting said drive shaft in rotary driving relation to said operating shaft and providing between said drive shaft and said operating shaft rotary lost motion which is at least equal in degree to the rotary spacing from each other of said open valve position and said closed valve position of said operating shaft, a valve open abutment movably supported on said housing means, a control solenoid connected with said valve open abutment to effect upon energization of the solenoid movement of said valve open abutment into an operative position for engagement with said rotary abutment means to hold said operating shaft in its valve open position against the applied torque of said spring means so long as the solenoid is energized electrically, energizing circuit means connected with said motor and said solenoid, said circuit means including means for energizing said motor for rotating said drive shaft in a valve opening direction and for energizing said control solenoid to hold said operating shaft in its valve open position, and said circuit means including means for reversing said motor after said operating shaft has reached its open valve position and for deenergizing said motor after said drive shaft has rotated in a direction opposite to said valve opening direction through an angle at least equal to the rotary displacement from each other of said valve open position and said valve closed position of said operating shaft.

9. An electrically powered valve comprising, in combination, a valve body, a flow control element disposed in said body, a rotary control stem connected with said flow control element to move the latter between a closed valve position and an open valve position thereof, said control stem extending outwardly through said body, housing means, a power supply assembly supported on said housing means and including a rotary drive shaft disposed in coaxial relation to said control stem, said power supply assembly including a reversible electric drive motor and a torque multiplying transmission connecting the motor to the drive shaft, a valve operating shaft journalled in said housing means in coaxial relation to said drive shaft for rotation between a closed valve position and an open valve position of the valve operating shaft, means connecting said operating shaft with said control stem to rotate the latter, valve closing spring means connected with said operating shaft to apply a valve closing torque directly thereto, rotary abutment means supported on said operating shaft for rotation therewith, a closed valve abutment supported on said housing means to coact with said rotary abutment means to stop rotation of said operating shaft in said valve closing direction upon rotation of said operating shaft into its closed valve position, lost motion connecting means continuously connecting said drive shaft in rotary driving relation to said operating shaft and providing between said drive shaft and said operating shaft rotary lost motion of a degree which is at least equal to the rotary spacing with respect to each other of said closed valve position and open valve position of said operating shaft, a valve open abutment movably supported on said housing means, a control solenoid connected with said valve open abutment to effect upon energization of the solenoid movement of said valve open abutment into an operative position for engagement with said rotary abutment means to hold said operating shaft in said valve open position thereof against the applied torque of said spring means so long as the solenoid is energized electrically, energizing circuit means connected with said motor and said solenoid, said circuit means including means for energizing said motor for rotating said drive shaft in a valve opening direction and for energizing said control solenoid to hold said operating shaft in its open valve position, and said circuit means including means for reversing said motor after said operating shaft has reached its open valve position and for deenergizing said motor after said drive shaft has rotated in a direction opposite to said valve opening direction through an angle which is at least equal to said rotary spacing with respect to each other of said closed valve position and said open valve position of said operating shaft so that said operating shaft can be turned from its open valve position to its closed valve position by said spring means upon deenergization of said solenoid without rotating said drive shaft even though the drive shaft is continuously connected in rotary driving relation to said operating shaft by said lost motion connecting means.

References Cited
UNITED STATES PATENTS

| | | | |
|---|---|---|---|
| 2,738,033 | 3/1956 | Towle et al. | 251—134 X |
| 2,930,571 | 3/1960 | Vogl | 251—71 X |
| 3,011,754 | 12/1961 | Ander | 251—134 X |
| 3,085,718 | 4/1963 | La Pointe | 251—134 X |
| 3,137,475 | 6/1964 | Schoenecker et al. | 251—133 X |
| 3,248,080 | 4/1966 | Plasko | 251—133 X |

M. CARY NELSON, *Primary Examiner.*

ROBERT C. MILLER, *Assistant Examiner.*

U.S. Cl. X.R.

251—134